(12) United States Patent
Wang et al.

(10) Patent No.: US 9,545,693 B2
(45) Date of Patent: Jan. 17, 2017

(54) CONSUMABLE INSERT FOR WELDING

(71) Applicant: Caterpillar Inc., Peoria, IL (US)

(72) Inventors: Huijun Wang, Peoria, IL (US); Leon R. Adcock, Chillicothe, IL (US); Kendall R. Powell, Peoria, IL (US); Donald A. Stickel, III, Chillicothe, IL (US); Howard W. Ludewig, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 88 days.

(21) Appl. No.: 14/507,924

(22) Filed: Oct. 7, 2014

(65) Prior Publication Data
US 2016/0096241 A1    Apr. 7, 2016

(51) Int. Cl.
| | |
|---|---|
| *B23K 31/02* | (2006.01) |
| *B23K 35/02* | (2006.01) |
| *B23K 37/06* | (2006.01) |
| *B23K 37/00* | (2006.01) |
| *G05B 19/4099* | (2006.01) |
| *B23K 35/00* | (2006.01) |
| *B23K 9/035* | (2006.01) |
| *B33Y 80/00* | (2015.01) |

(52) U.S. Cl.
CPC ........... *B23K 35/0222* (2013.01); *B23K 9/035* (2013.01); *B23K 31/02* (2013.01); *B23K 35/00* (2013.01); *B23K 35/0294* (2013.01); *B23K 37/00* (2013.01); *B23K 37/06* (2013.01); *G05B 19/4099* (2013.01); *B33Y 80/00* (2014.12)

(58) Field of Classification Search
None
See application file for complete search history.

(56) References Cited

U.S. PATENT DOCUMENTS

| | | | | |
|---|---|---|---|---|
| 2,654,252 | A | * 10/1953 | Davis | ..................... A47G 21/04 |
| | | | | 30/324 |
| 2,792,490 | A | 5/1957 | Risch et al. | |
| 3,541,625 | A | * 11/1970 | Burggraaf | ................ H05H 1/30 |
| | | | | 219/121.36 |
| 3,895,924 | A | 7/1975 | Hallenbeck | |

(Continued)

FOREIGN PATENT DOCUMENTS

| | | | | |
|---|---|---|---|---|
| DE | WO 2005068128 A1 | * | 7/2005 | ............. B23K 37/06 |
| DE | WO 2010015247 A1 | * | 2/2010 | ............. B21C 23/14 |

(Continued)

*Primary Examiner* — Kiley Stoner
(74) *Attorney, Agent, or Firm* — William R. Tinker

(57) ABSTRACT

A consumable insert for welding a first component to a second component is provided. The first component is positioned with respect to the second component in such a manner that a gap is defined between adjacent surfaces thereof. The consumable insert includes a body having a profile. The profile of the body matches a scan of a profile of the gap between the adjacent surfaces. The consumable insert also includes a dam portion having a profile. The profile of the dam portion matches, at least in part, a scan of corresponding surfaces of the first component and the second component respectively. The dam portion is provided in contact with at least one end of the body. The dam portion is configured to control an overflow of a weld puddle therefrom. The body and the dam portion are formed using three dimensional printing.

12 Claims, 7 Drawing Sheets

(56) References Cited

U.S. PATENT DOCUMENTS

| | | | | | |
|---|---|---|---|---|---|
| 4,425,711 | A | * | 1/1984 | Wood | A47G 21/04 30/324 |
| 4,515,000 | A | * | 5/1985 | von Ahrens | B21C 1/003 72/274 |
| 4,782,993 | A | * | 11/1988 | Cartossi | A47J 36/02 228/184 |
| 4,863,174 | A | * | 9/1989 | Cummings | A63B 67/083 273/412 |
| 5,351,625 | A | * | 10/1994 | Culligan | B61D 5/06 105/362 |
| 5,372,761 | A | * | 12/1994 | Anderson, Sr. | B32B 17/10963 156/94 |
| 5,624,067 | A | * | 4/1997 | Harwig | B23K 37/06 228/216 |
| 5,678,450 | A | * | 10/1997 | Robbins | G01F 19/002 73/426 |
| 6,023,051 | A | * | 2/2000 | Fellows | A47J 37/0676 126/25 R |
| 6,115,923 | A | * | 9/2000 | Gentry | A47G 21/02 30/142 |
| 6,207,920 | B1 | * | 3/2001 | Morlock | B23K 9/0026 219/137 R |
| 6,581,438 | B1 | * | 6/2003 | Hall | B23K 31/02 73/53.01 |
| 7,115,324 | B1 | * | 10/2006 | Stol | B23K 9/02 428/157 |
| D548,116 | S | * | 8/2007 | Curtin | D10/46.3 |
| 7,810,237 | B2 | | 10/2010 | Lange et al. | |
| 8,438,915 | B2 | | 5/2013 | McCall et al. | |
| 2002/0125295 | A1 | * | 9/2002 | Mudge, Jr. | B23K 37/06 228/50 |
| 2005/0041852 | A1 | * | 2/2005 | Schwarz | B23K 9/0956 382/152 |
| 2009/0075765 | A1 | * | 3/2009 | Eldridge | A63B 59/20 473/513 |
| 2012/0198676 | A1 | | 8/2012 | Rickenbacher et al. | |
| 2014/0048518 | A1 | * | 2/2014 | Ogura | B23K 26/22 219/121.64 |
| 2015/0197061 | A1 | * | 7/2015 | Wang | B29C 67/0088 700/98 |
| 2016/0025543 | A1 | * | 1/2016 | Krumm | G01F 19/002 73/426 |

FOREIGN PATENT DOCUMENTS

| | | | | |
|---|---|---|---|---|
| DE | 102010018354 | * | 10/2011 | B23K 9/02 |
| FR | 2570590 A | * | 3/1986 | |
| JP | WO 2010084926 A1 | * | 7/2010 | B23K 26/24 |
| WO | WO 2015108810 A1 | * | 7/2015 | B29C 67/0088 |

* cited by examiner

US 9,545,693 B2

CONSUMABLE INSERT FOR WELDING

TECHNICAL FIELD

The present disclosure relates to a consumable insert, and more specifically to a consumable insert utilized for welding two components.

BACKGROUND

During welding of a joint formed between two surfaces, a backing plate may be used on one side of the joint when a large gap may be present in the joint or when there is a large variation in the joint. In such a situation, the backing plate may be permanently installed behind the joint after the welding, thus, adding extra weight and material cost to the joint. Also, the welded joint may have a lower fatigue class because of presence of stress risers in the joint leading to premature joint failure.

In some situations, the joint may be present in a confined area such that there may be limited or restricted access to set up the backing plate. In such a situation, a full penetration weld may have to be performed only from one side. As a result, a required quality of the weld joint may not be achieved. Further, a weld puddle formed during the welding may flow from sides of the joint and may get deposited therein after the welding as an excess material that could be a discontinuity or a defect. This excess material may lead to wastage of the material. Additionally, the excess material may have to be machined after the welding to complete the joint. This machining may add to welding time, effort and cost.

U.S. Pat. No. 2,792,490 describes a method of welding adjacent edges of two metal parts by the use of a welding torch and without the use of a backup plate. The method includes providing a consumable insert piece against which the edges of the parts to be welded together are abutted. The method includes moving the welding torch along one side of the insert and supplying sufficient heat through the torch to completely melt the insert to form successive molten weld puddles. The consumable insert is proportioned as to shape and composition such that the heat input from the welding torch completely melts the consumable insert and the parent metal of the parts being welded together.

SUMMARY OF THE DISCLOSURE

In one aspect of the present disclosure, a consumable insert for welding a first component to a second component is provided. The first component is positioned with respect to the second component in such a manner that a gap is defined between adjacent surfaces thereof. The consumable insert includes a body having a profile. The profile of the body matches a scan of a profile of the gap between the adjacent surfaces. The consumable insert also includes a dam portion having a profile. The profile of the dam portion matches, at least in part, a scan of corresponding surfaces of the first component and the second component respectively. The dam portion is provided in contact with at least one end of the body. The dam portion is configured to control an overflow of a weld puddle therefrom. The body and the dam portion are formed using three dimensional printing.

In another aspect of the present disclosure, a method for welding a first component and a second component is provided. The method includes placing the first component and the second component in such a manner that a gap is defined between adjacent surfaces thereof. The method includes scanning a profile of the gap between the adjacent surfaces. The method includes preparing a three dimensional model corresponding to the scanned profile of the gap. The method includes forming, by three dimensional printing, a body and a dam portion of a consumable insert. A profile of the body and a profile of the dam portion is based on the three dimensional model. The method also includes aligning the body and the dam portion with respect to the gap between the adjacent surfaces. The method further includes welding the body and the dam portion with the adjacent surfaces such that the body and the dam portion are consumed, at least in part, into a weld puddle.

In another aspect of the present disclosure, a method for forming a consumable insert for welding a first component and a second component is provided. The method includes scanning a profile of a gap between adjacent surfaces of the first component and the second component. The method includes scanning corresponding surfaces of the first component and the second component respectively. The method also includes preparing a three dimensional model corresponding to the scanned profile of the gap and the scan of the corresponding surfaces. The method further includes forming, by three dimensional printing, a body and a dam portion of the consumable insert. A profile of the body matches the scanned profile of the gap. A profile of the dam portion matches the scan of the corresponding surfaces. The formation is based on the three dimensional model.

Other features and aspects of this disclosure will be apparent from the following description and the accompanying drawings.

DETAILED DESCRIPTION

Figure 1:
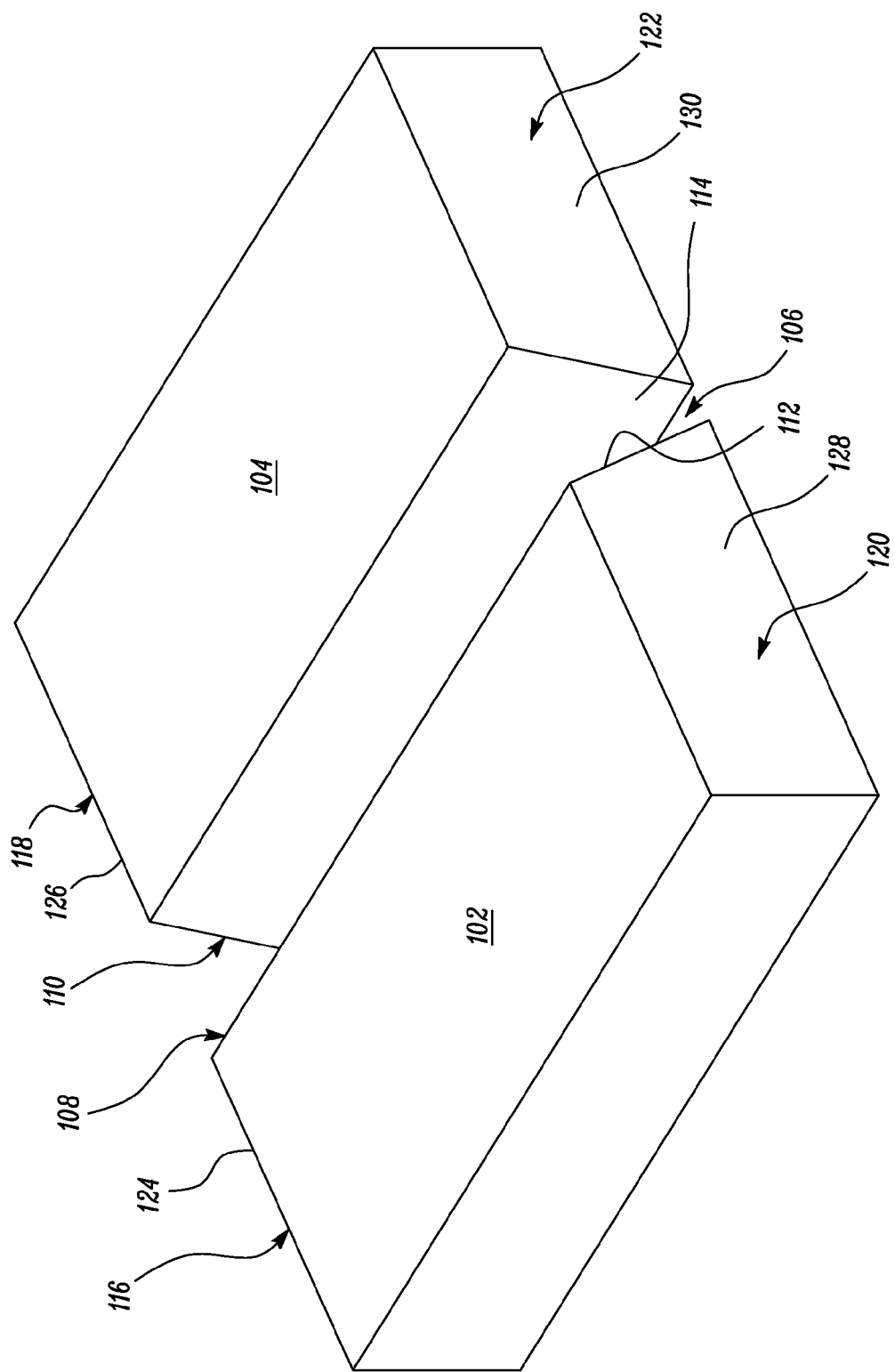
FIG. 1 is an exemplary arrangement of a first component and a second component placed adjacent to one another, according to an embodiment of the present disclosure.

Wherever possible, the same reference numbers will be used throughout the drawings to refer to the same or similar parts. Referring to FIG. 1, an exemplary arrangement of a first component 102 and a second component 104 is illustrated. The first component 102 is placed adjacent to the second component 104. The first component 102 is positioned with respect to the second component 104 in a manner such that a gap 106 is defined between adjacent surfaces 108, 110 of the first and second components 102, 104 respectively. More specifically, the adjacent surfaces 108, 110 include a first surface 112 of the first component 102 and a second surface 114 of the second component 104.

Each of the first and second components 102, 104 has a flat, plate like configuration. In other embodiments, the first and second components 102, 104 may have any other configuration, such as, cylindrical, semi circular, stepped, and so on. Also, the first and second components 102, 104 are coplanar. In other embodiments, the first and second components 102, 104 may be inclined to one another or placed in different planes. The first and second components 102, 104 may be any component of an engine or a machine, such as, for example, a wall, a frame, a platform, and so on.

Figure 2:
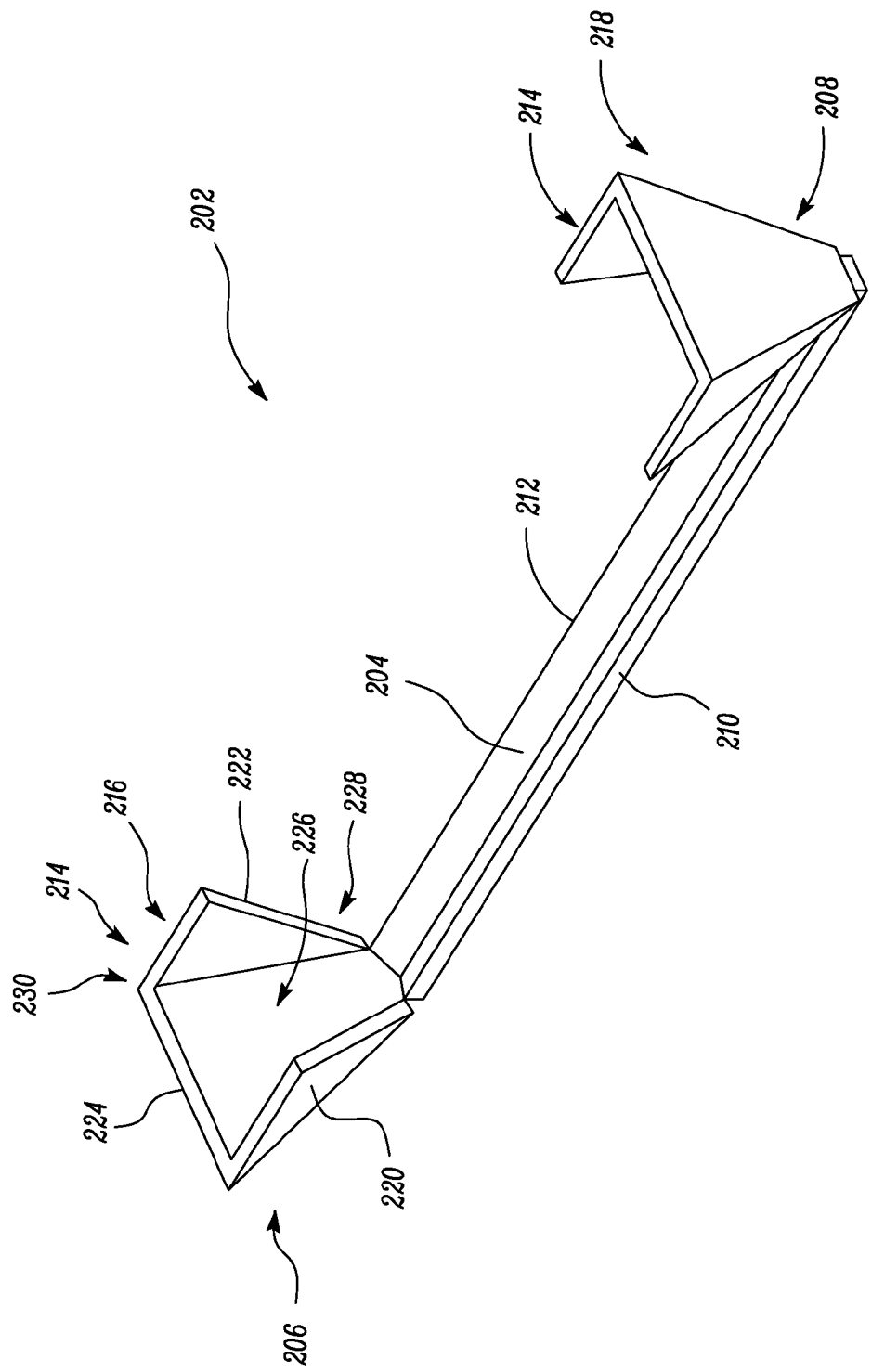
FIG. 2 is an exemplary consumable insert, according to an embodiment of the present disclosure.

Referring to FIG. 2, a perspective view of a consumable insert 202 is illustrated. The consumable insert 202 may be utilized for welding the first component 102 and the second component 104. The consumable insert 202 includes a body 204 having a profile. The body 204 includes a first end 206 and a second end 208. The second end 208 is distal from the first end 206. The body 204 includes a first side 210 extending between the first and second ends 206, 208. The first side 210 has a profile matching a profile of the first surface 112 of the first component 102. The body 204 also includes a second side 212 opposing the first side 210. The second side 212 extends between the first and second ends 206, 208. The second side 212 has a profile matching a profile of the second surface 114 of the second component 104. As a result, the profile of the body 204 matches a profile of the gap 106. The body 204 is formed using three dimensional printing methods known in the art and will be explained in detail in the subsequent section.

Further, the consumable insert 202 includes a dam portion 214 having a profile. The profile of the dam portion 214 matches, at least in part, corresponding surfaces 116, 118, 120, 122 of the first and second components 102, 104. For example, the corresponding surfaces 116, 118 are left side surfaces 124, 126 of the first and second components 102, 104 respectively. Also, the corresponding surfaces 120, 122 are right side surfaces 128, 130 of the first and second components 102, 104 respectively. A person of ordinary skill in the art will appreciate that the corresponding surfaces 116, 118, 120, 122 may include any surface positioned at end points of the components to be welded, such that a shape of the dam portion 214 conforms with the shape of the surfaces present at the end points.

Figure 3:
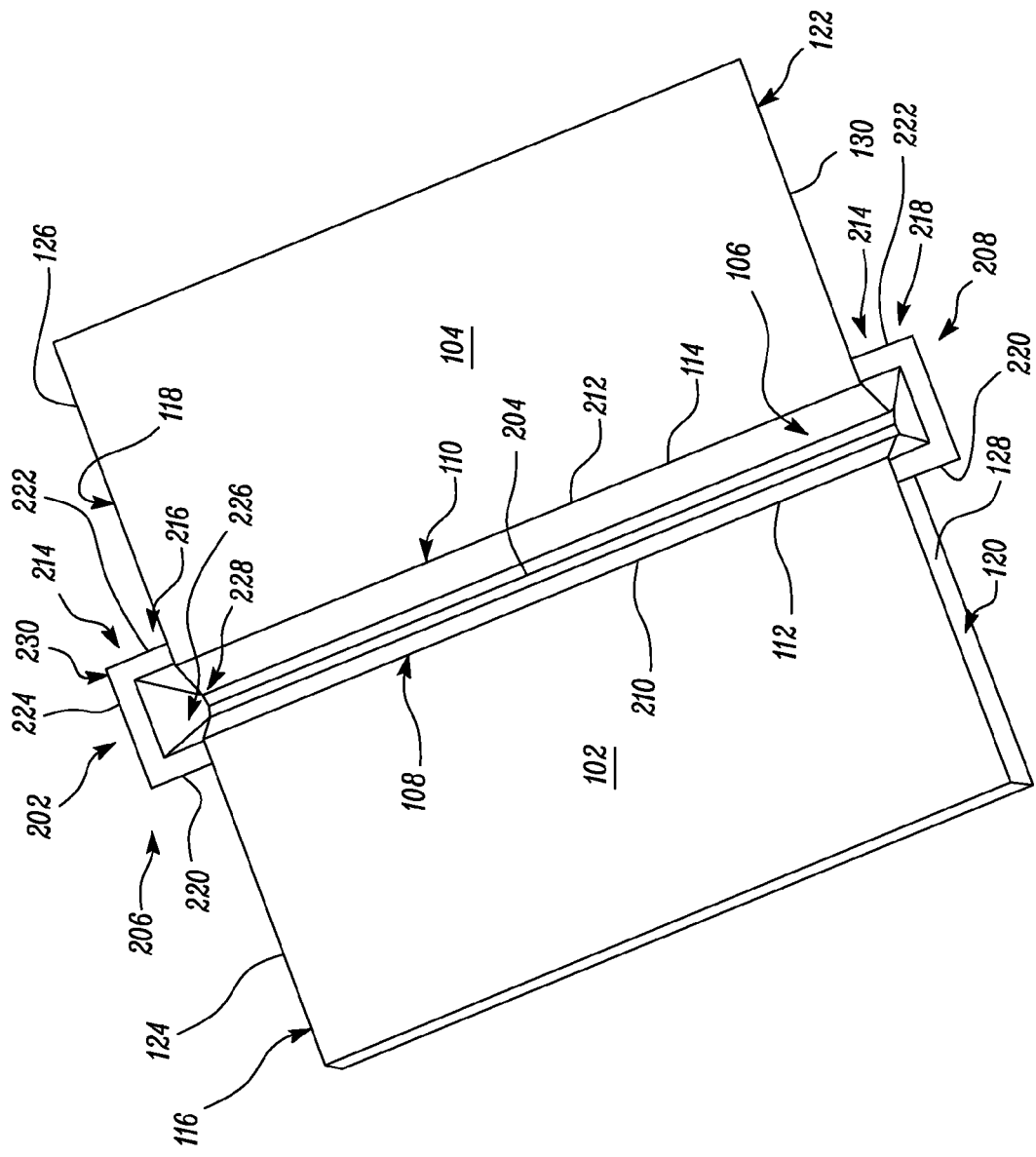
FIG. 3 is a top perspective view of an exemplary arrangement of the consumable insert placed in a gap between the first component and the second component, according to an embodiment of the present disclosure.

More specifically, the consumable insert 202 includes a pair of dam portions 214. The pair of dam portions 214 includes a first dam portion 216 and a second dam portion 218. Referring to FIG. 3, a top perspective view of an exemplary arrangement of the consumable insert 202 placed in the gap 106 between the first component 102 and the second component 104 is illustrated. As shown, the first dam portion 216 is provided in contact with the first end 206 and the second dam portion 218 provided in contact with the second end 208. In other embodiments, the dam portion 214 may be provided in contact with any one of the first and second ends 206, 208. The dam portion 214 is configured to control an overflow of a weld puddle produced during the welding.

Referring back to FIG. 2, the dam portion 214 includes a first sidewall 220. The dam portion 214 also includes a second sidewall 222 placed opposing the first sidewall 220. The first and second sidewalls 220, 222 are positioned to form a V-shaped cross section. In other embodiments, the first and second sidewalls 220, 222 may be positioned in any manner to form a U-shaped cross section, a C-shaped cross section, and so on. The first and second sidewalls 220, 222 are positioned to contact with the corresponding surfaces 116, 118, 120, 122 of the first and second components 102, 104. More specifically, as shown in FIG. 3, the first and second sidewalls 220, 222 of the first dam portion 216 are provided in contact with the left side surfaces 124, 126 of the first and second components 102, 104 respectively prior to the welding. Additionally, the first and second sidewalls 220, 222 of the second dam portion 218 are provided in contact with the right side surfaces 128, 130 of the first and second components 102, 104 respectively prior to the welding.

Further, the dam portion 214 also includes a lateral wall 224 extending between the first and second sidewalls 220, 222 in such a manner that a hollow interior space 226 is defined in the dam portion 214. The dam portion 214 is provided substantially perpendicular to the body 204 of the consumable insert 202. More specifically, the dam portion 214 includes a side open end 228 and a top open end 230. The side open end 228 is positioned facing the body 204 of the consumable insert 202. The top open end 230 is substantially perpendicular to the side open end 228.

Figure 4:
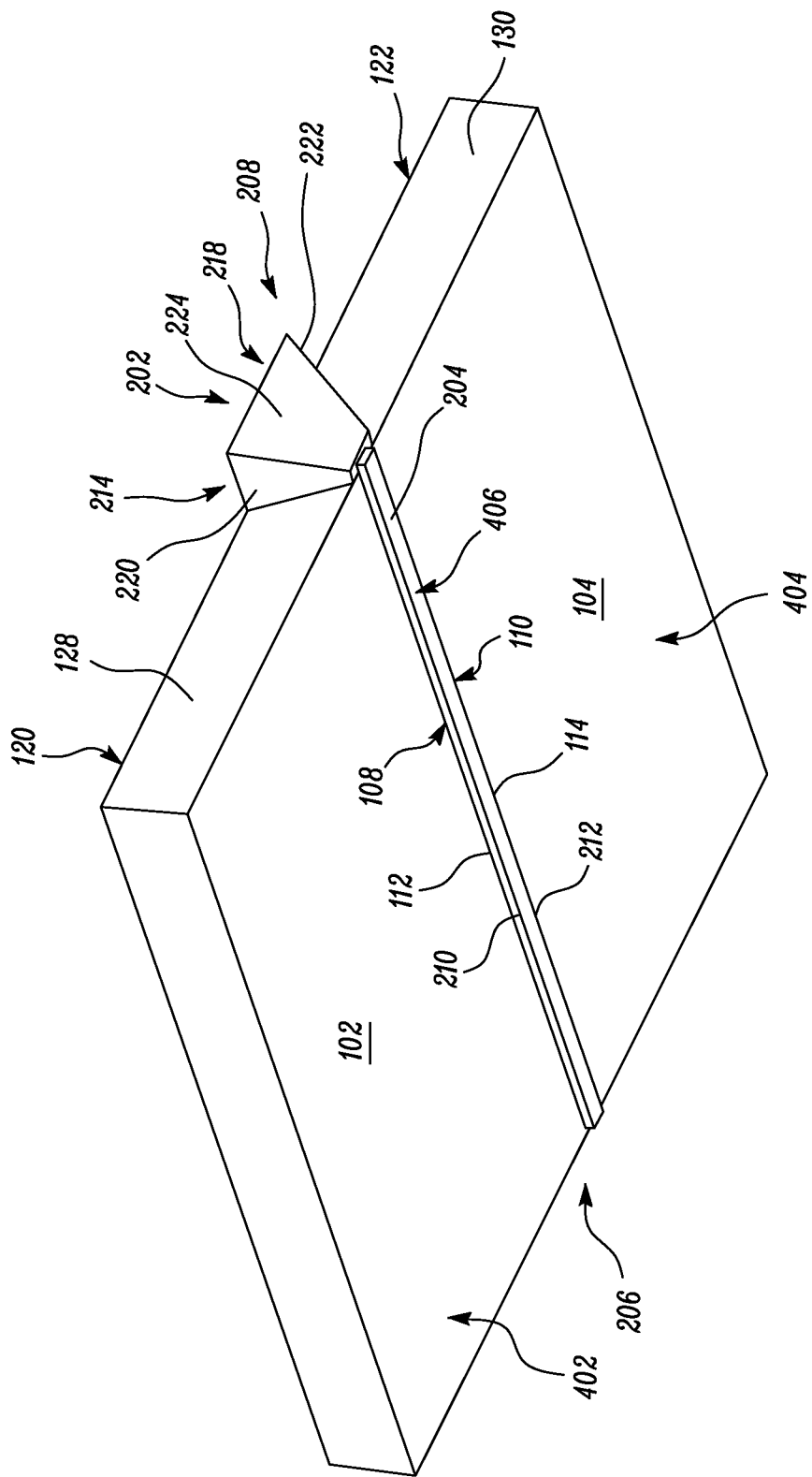
FIG. 4 is a bottom perspective view of the exemplary arrangement of the consumable insert placed in the gap between the first component and the second component, according to an embodiment of the present disclosure.

Referring to FIG. 4, a bottom perspective view of the exemplary arrangement of the consumable insert 202 placed in the gap 106 between the first component 102 and the second component 104 is illustrated. As shown, the first side 210 of the body 204 is provided in contact with the first surface 112. Also, the second side 212 is provided in contact with the second surface 114. Additionally, the consumable insert 202 is aligned within the gap 106 such that a lower side 406 of the body 204 extends below lower surfaces 402, 404 of the first and second components 102, 104 respectively. In other embodiments, the body 204 may be provided such that the lower side 406 may be coplanar with the lower surface 402 of the first component 102 and/or the lower surface 404 of the second component 104. In yet another embodiment, the body 204 may be provided such that the lower side 406 may be depressed with respect to the lower surface 402 of the first component 102 and/or the lower surface 404 of the second component 104. In such a situation, the lower side 406 of the body 204 may rest within the gap 106.

Figure 5:
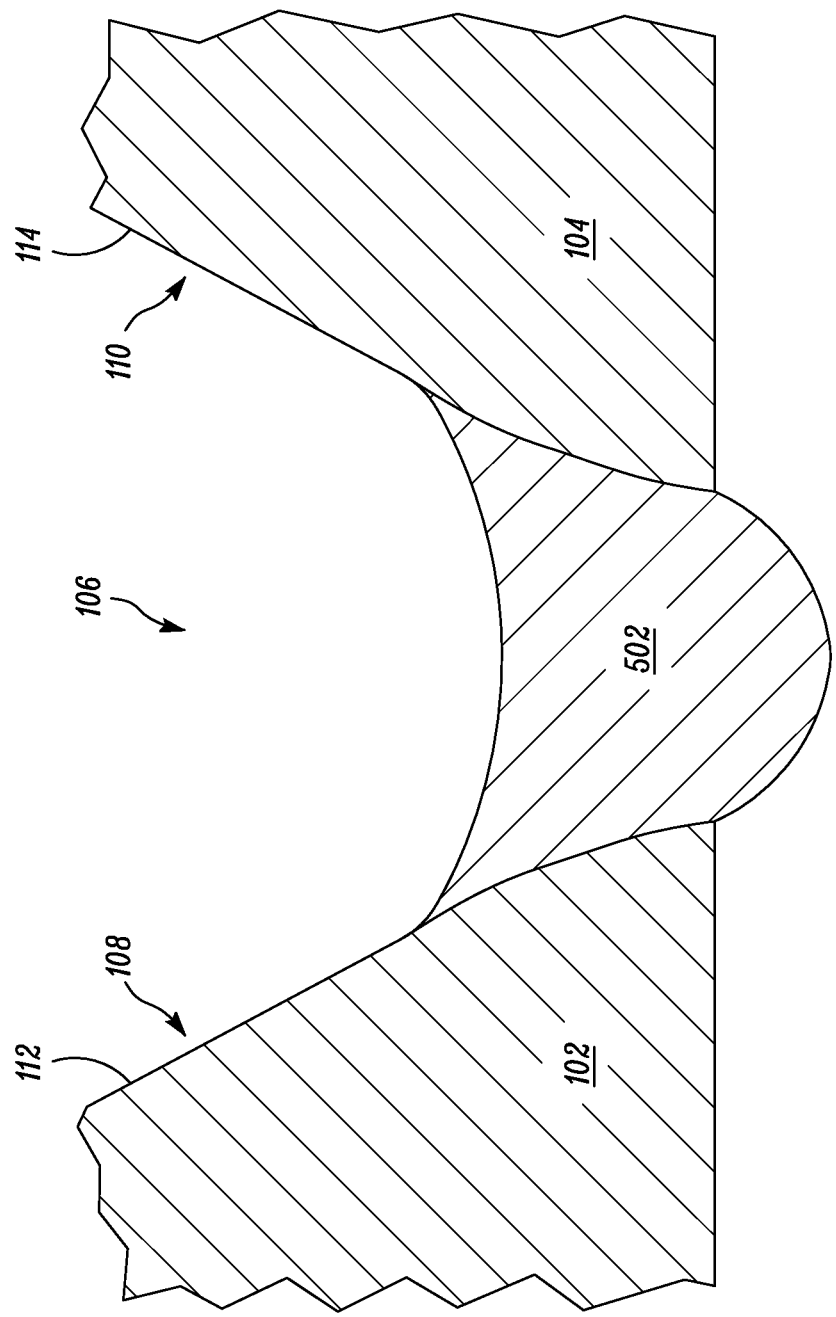
FIG. 5 is a cross sectional view of a weld formed between the first component, the second component, and the consumable insert, according to an embodiment of the present disclosure.

Referring to FIG. 5, a cross sectional view of a weld 502 formed between the first component 102, the second component 104, and the consumable insert 202 is illustrated. It should be noted that a volume of the weld 502 may be a cumulative volume of a volume of the body 204 and a volume of the dam portion 214 of the consumable insert 202, and a volume of a portion of the adjacent surfaces 108, 110 which are consumed during the welding. The volume of the weld 502 may be based on a required quality, strength or both of the weld 502.

For example, in the illustrated embodiment, the volume of the weld 502 is such that only a portion of the gap 106 is consumed by the weld 502 based on the required quality, strength or both of the weld 502. In other embodiments, the volume of the weld 502 may be relatively higher such that half or complete area of the gap 106 may be consumed by the weld 502 based on the required quality, strength or both of the weld 502. Accordingly, to achieve the required volume of the weld 502, the volume of the body 204, the volume of the dam portion 214 or both may be modified.

The volume of the dam portion 214 may be based on a shape and a size of the dam portion 214. Accordingly, a size, a shape or both of the dam portions 214 are based on the profile of the gap 106 between the adjacent surfaces 108, 110. In some embodiments, the size, the shape or both of the first dam portion 216 may be similar to the size, the shape or both of the second dam portion 218 respectively such that the required volume of the weld 502 may be equal to the cumulative volume of the volume of the body 204 and the volume of the first dam portion 216 and the volume of the second dam portion 218. Alternatively, in other embodiments, the size, the shape or both of the first dam portion 216 may be different from the size, the shape or both of the second dam portion 218 respectively such that the required volume of the weld 502 may be equal to the cumulative volume of the volume of the body 204 and the volume of the first dam portion 216 and the volume of the second dam portion 218.

The dam portion 214 is formed using any three dimensional printing method known in the art. In some embodiments, the dam portion 214 may be integrated with the body 204 of the consumable insert 202 such that the consumable insert 202 is a unitary component prior to the welding. In other embodiments, the dam portion 214 may be a separate component different from the body 204 of the consumable insert 202. In such a situation, the dam portion 214 may be provided in contact with, and coupled to the body 204 by any fastening method known in the art including, but not limited to, bolting, riveting, brazing, soldering, welding, and clamping.

The body 204 and the dam portion 214 of the consumable insert 202 may be made of any metal or an alloy known in the art. In some embodiments, the body 204 and the dam portion 214 may be made of any low transformation temperature material known in the art. In other embodiments, the body 204, the dam portion 214 or both may be made of a material similar to a material of the first component 102, the second component 104 or both. In yet other embodiments, the body 204, the dam portion 214 or both may be made of a material different from a material of the first component 102, the second component 104 or both.

Figure 6:
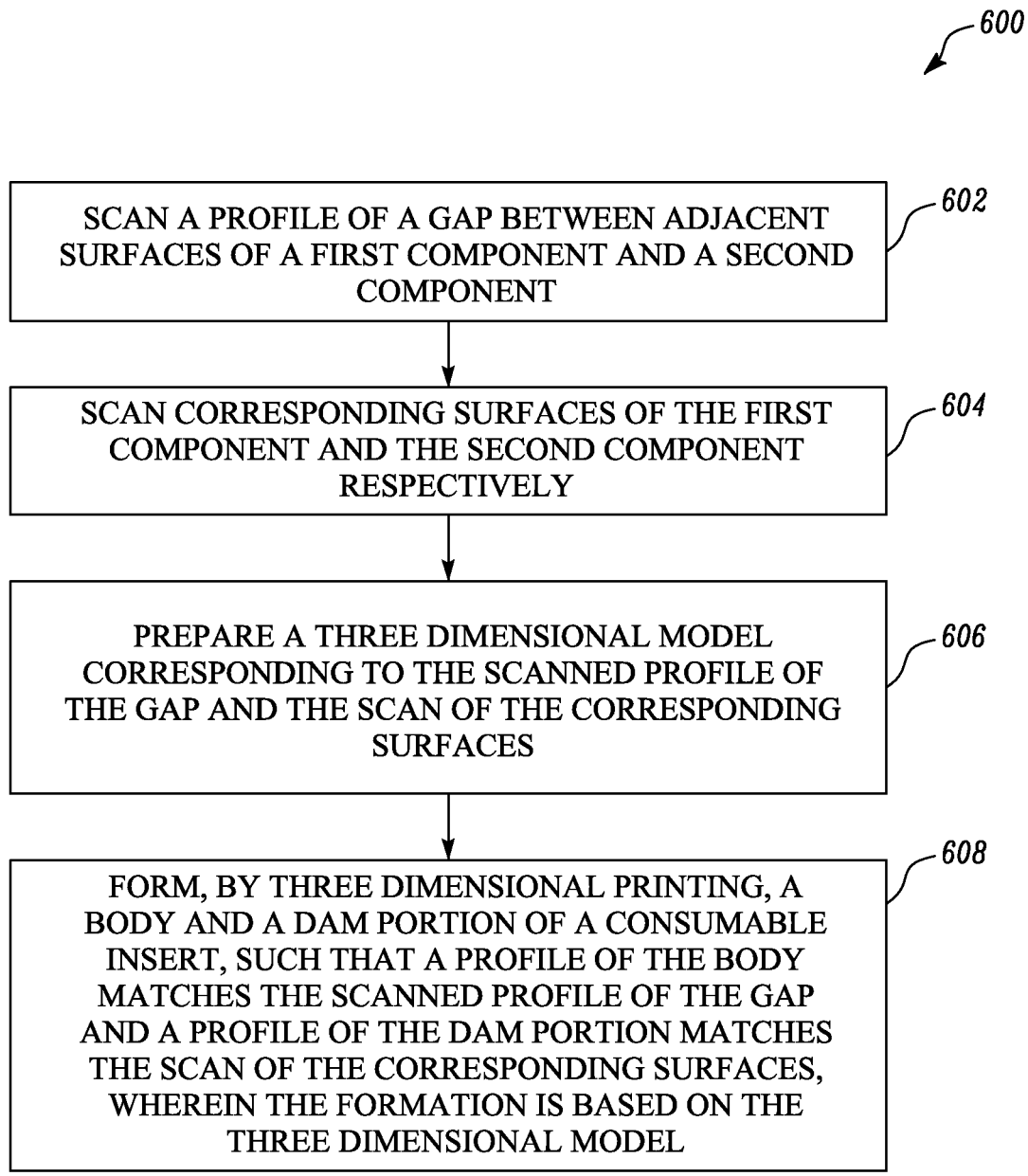
FIG. 6 is a flowchart of a method of forming the consumable insert, according to an embodiment of the present disclosure.

A method 600 of forming the consumable insert 202 will now be explained with reference to FIG. 6. FIG. 6 is a flowchart of the method 600. At step 602, the profile of the gap 106 between the adjacent surfaces 108, 110 of the first and second components 102, 104 is scanned. At step 604, the corresponding surfaces 116, 118, 120, 122 of the first and second components 102, 104 respectively are scanned. More specifically, at least a portion of the corresponding surfaces 116, 118, 120, 122 adjacent to the gap 106 are scanned. The scanning may be performed by any scanning method known in the art, such as, laser scanning, white light scanning, blue light scanning, touch sensing scanning, and so on.

At step 606, based on the scans, a three dimensional model is prepared such that the model corresponds to the scanned profile of the gap 106 and the scan of the corresponding surfaces 116, 118, 120, 122. More specifically, the three dimensional model includes an insert model matching the scanned profile of the gap 106. Additionally, the three dimensional model includes a dam model matching the scan of the corresponding surfaces 116, 118, 120, 122. The three dimensional model may be prepared by any method or a software known in the art configured to prepare a three dimensional model based on a scan of a component.

At step 608, the body 204 and the dam portion 214 of the consumable insert 202 are formed based on the three dimensional model. The body 204 is formed using three dimensional printing such that the profile of the body 204 corresponds to the insert model and, thus, matches the scanned profile of the gap 106. The dam portion 214 is also formed using three dimensional printing such that the profile of the dam portion 214 corresponds to the dam model and, thus, matches the scanned profile of the corresponding surfaces 116, 118, 120, 122. The dam portion 214 is provided on at least one of the first end 206 and the second end 208 of the body 204. More specifically, the pair of dam portions 214 is provided at the first and second ends 206, 208 of the body 204. The pair of dam portions 214 includes the first dam portion 216 and the second dam portion 218 provided at the first end 206 and the second end 208 respectively. Further, at least one of the shape and the size of the dam portion 214 is based, at least in part, on the profile of the gap 106 between the first and second surfaces 112, 114 of the first and second components 102, 104 respectively.

INDUSTRIAL APPLICABILITY

Generally, a weld joint with a backing plate may have a low weld fatigue class. This may be due to a notch effect between the backing plate and at least a part of a back surface of the weld joint. In some situations, a ceramic backing plate may be used in order to improve the weld fatigue class. However, the backing plate and the ceramic backing plate may require an access to the back surface of the weld joint which may be restricted in some situations. In some situations, a standardized consumable insert may be used or an open root welding may be performed to complete the welding. However, both the standardized consumable insert and the open root welding method may require additional machining for joint preparation before the welding. Further, in situations when a large variation in the weld joint or mismatched weld joint may exist, it may be difficult to use the standardized consumable insert.

The present disclosure provides the consumable insert 202 and the method 600 of forming the consumable insert 202. The consumable insert 202 is formed using three dimensional printing such that the profile of the body 204 matches the profile of the gap 106. As a result, the consumable insert 202 may be customized based on any profile of the gap 106 such as between large and mismatched weld joints. Additionally, the size of the body 204 may be customized to provide the required quality and strength of the weld 502, thus, reducing weld thickness, material wastage, welding time and effort, and welding cost.

Additionally, the consumable insert 202 includes the dam portion 214 on the first end 206, the second end 208 of the body 204 or both. The dam portion 214 is also formed using three dimensional printing such that the profile of the dam portion 214 corresponds to the scanned profile of the corresponding surfaces 116, 118, 120, 122. The dam portion 214 has the side open end 228 communicating with the body 204 of the consumable insert 202 and the gap 106 to be welded, such that the weld puddle formed during the welding may be contained within the dam portion 214. The weld puddle may be controlled from overflowing or spilling out of the dam portion 214 during the welding. In other embodiments, the overflow of the weld puddle may be reduced, minimized or eliminated due to the presence of the dam portion 214 in contact with the adjacent surfaces 108, 110 of the first and second components 102, 104.

Further, as the welding may progress, the dam portion 214 may, at least in part, be consumed into the weld puddle. Simultaneously, the temperature of the welding may be adjusted to control the flow of the weld puddle from the gap 106 between the adjacent surfaces 108, 110 of the first and second surfaces 112, 114. As a result, use of the backing plate behind the gap 106, side plates (not shown) or both adjacent to the dam portion 214 may be omitted. This may reduce use of additional material during the welding, reduce an overall structural weight, and reduce additional machining required after the welding to remove excess material. Also, a full penetration welding may be performed from only one side of the joint, thus, enabling automation of the complete welding process. Additionally, the consumable insert 202 is made of a low transformation temperature material or any other special alloy or material which may lead to low surface tension, low residual stress or both in the weld 502, thus, improving the fatigue class of the weld 502. This in turn, may result in lower thickness of the weld 502 due to improved fatigue life, lowered product cost, and lowered structural weight.

Figure 7:
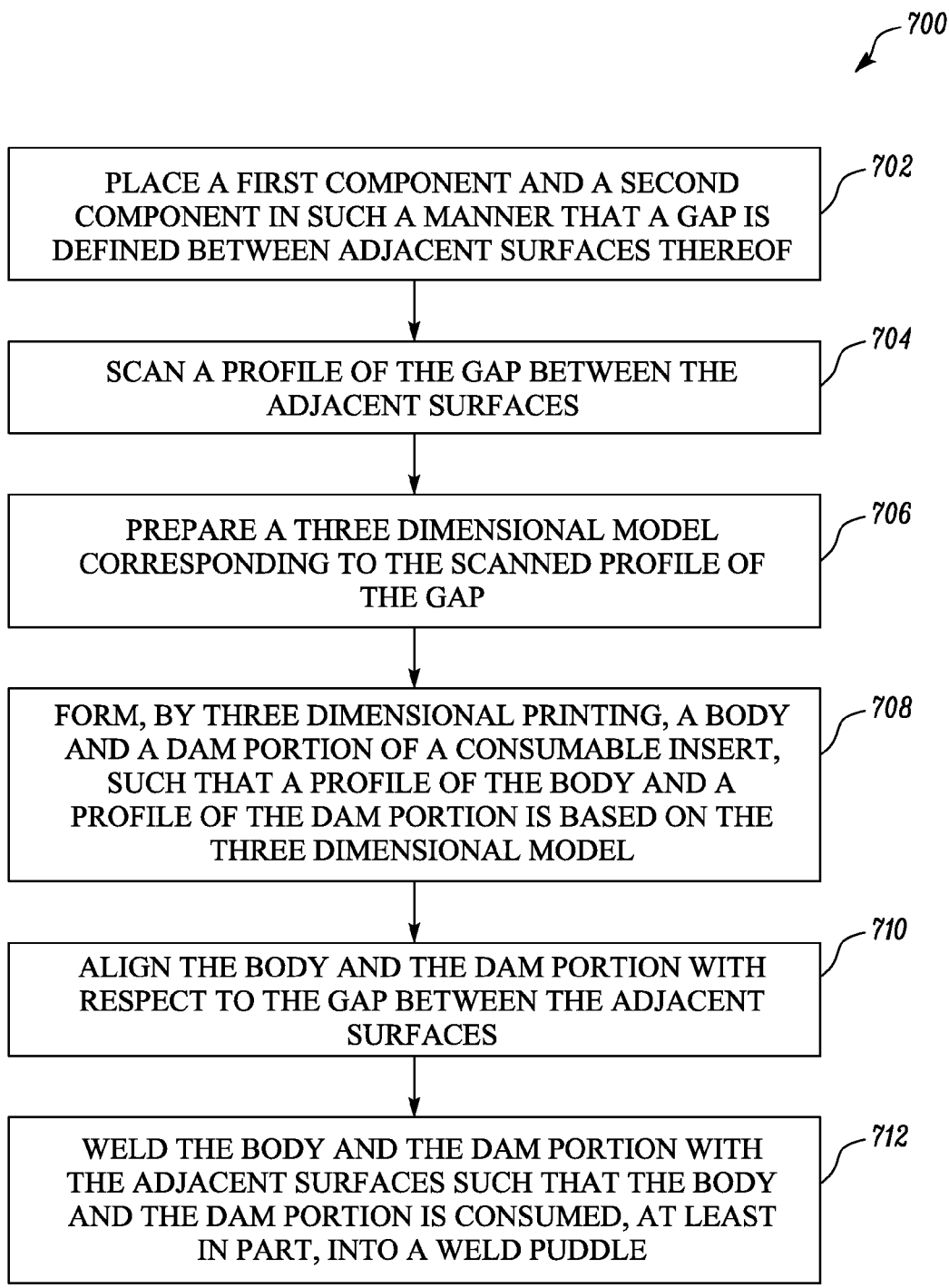
FIG. 7 is a flowchart of a method of welding the first component, the second component, and the consumable insert, according to an embodiment of the present disclosure.

The present disclosure relates to a method 700 for welding the first component 102 and the second component 104. Referring to FIG. 7, a flowchart of the method 700 is illustrated. At step 702, the first component 102 and the second component 104 are placed in such a manner that the gap 106 is defined between the adjacent surfaces 108, 110 thereof (see FIG. 1). More specifically, the gap 106 is formed between the first surface 112 of the first component 102 and the second surface 114 of the second component 104.

At step 704, the profile of the gap 106 between the adjacent surfaces 108, 110 of the first and second components 102, 104 is scanned. Additionally, the corresponding surfaces 116, 118, 120, 122 of the first and second components 102, 104 respectively may also be scanned. The scanning may be performed by any scanning method known in the art such as, laser scanning, white light scanning, blue light scanning, touch sensing scanning, and so on.

At step 706, based on the scan, the three dimensional model is prepared such that the model corresponds to the scanned profile of the gap 106. More specifically, the three dimensional model includes the insert model matching the scanned profile of the gap 106 and the dam model matching the scan of the corresponding surfaces 116, 118, 120, 122. The three dimensional model may be prepared by any method or software known in the art configured to prepare the three dimensional model based on the scan of the component.

At step 708, the body 204 and the dam portion 214 of the consumable insert 202 is formed based on the three dimensional model. The body 204 is formed using three dimensional printing, such that the profile of the body 204 corresponds to the insert model and, thus, matches the scanned profile of the gap 106. The dam portion 214 is also formed using three dimensional printing such that the profile of the dam portion 214 corresponds to the dam model and, thus, matches the scanned profile of the corresponding surfaces 116, 118, 120, 122. The exemplary method 600 of forming the consumable insert 202 is described above in reference with FIG. 6.

The dam portion 214 is provided on at least one of the first end 206 and the second end 208 of the body 204. In one embodiment, the first dam portion 216 is provided at the first end 206 and the second dam portion 218 is provided at the second end 208. At least one of the shape and the size of the dam portion 214 is based on the profile of the gap 106 between the adjacent surfaces 108, 110 of the first and second components 102, 104 respectively.

At step 710, the body 204 and the dam portion 214 is aligned with respect to the gap 106 between the adjacent surfaces 108, 110 of the first component 102 and the second component 104. More specifically, the body 204 is placed in the gap 106 such that the first side 210 of the body 204 is at least partially in contact with the first surface 112 of the first component 102. Also, the body 204 is placed in the gap 106 such that the second side 212 of the body 204 is at least partially in contact with the second surface 114 of the second component 104 (see FIG. 4). Further, the dam portion 214 is placed in contact with at least the first end 206 and the second end 208 of the body 204 and the adjacent surfaces 108, 110 of the first and second components 102, 104.

At step 712, the body 204 and the dam portion 214 are welded with the adjacent surfaces 108, 110 of the first and second components 102, 104 such that the body 204 and the dam portion 214 are, at least in part, consumed into the weld puddle. During the welding, the dam portion 214 may control the overflow of the weld puddle from the first end 206, the second end 208 of the body 204 or both based on the positioning of the dam portion 214. Further, as the welding may progress, welding parameters such as the temperature of the welding, a rate of gas flow, a pressure of gas, and so on may be adjusted to control a viscosity of the weld puddle. The viscosity of the weld puddle may be controlled in a manner to control a flow of the weld puddle through the gap 106 between the first and second components 102, 104 during the welding.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for welding a first component and a second component, the method comprising: placing the first component and the second component in such a manner that a gap is defined between adjacent surfaces thereof; scanning a profile of the gap between the adjacent surfaces; preparing a three dimensional model corresponding to the scanned profile of the gap; forming, by three dimensional printing, a consumable insert including a body and a first dam portion and a second dam portion, such that a profile of the body and a profile of each dam portion is based on the three dimensional model; aligning the body and each dam portion with respect to the gap between the adjacent surfaces; and welding the body and each dam portion with the adjacent surfaces such that the body and each dam portion is consumed, at least in part, into a weld puddle.

2. The method of claim 1, wherein the preparing step further includes: preparing an insert model matching the scanned profile of the gap between the adjacent surfaces.

3. The method of claim 2, wherein the preparing step further includes: preparing a dam model matching, at least in part, a scan of corresponding surfaces of the first component and the second component respectively.

4. The method of claim 3, wherein the forming step further includes: forming each dam portion based on the dam model.

5. The method of claim 2, wherein the forming step further includes: forming the body based on the insert model.

6. The method of claim 1, wherein the welding step further includes controlling a temperature during the welding to control a viscosity of the weld puddle.

7. The method of claim 1, wherein the aligning step further includes placing the body in the gap between the adjacent surfaces, and placing each dam portion in contact with the body and the adjacent surfaces of the first component and the second component.

8. A method for forming a consumable insert for welding a first component and a second component, the method comprising: scanning a profile of a gap between adjacent surfaces of the first component and the second component; scanning corresponding surfaces of the first component and the second component respectively; preparing a three dimensional model corresponding to the scanned profile of the gap and the scan of the corresponding surfaces; and forming, by three dimensional printing, a consumable insert including a body and a first dam portion and a second dam portion, such that a profile of the body matches the scanned profile of the gap and a profile of each dam portion matches the scan of the corresponding surfaces, wherein the formation is based on the three dimensional model.

9. The method of claim 8, wherein the preparing step further includes: preparing an insert model matching the scanned profile of the gap between the adjacent surfaces.

10. The method of claim 9, wherein the preparing step further includes: preparing a dam model matching the scan of the corresponding surfaces.

11. The method of claim 10, wherein the forming step further includes: forming each dam portion based on the dam model.

12. The method of claim 9, wherein the forming step further includes: forming the body based on the insert model.

\* \* \* \* \*